US010414690B2

(12) United States Patent
Horta et al.

(10) Patent No.: US 10,414,690 B2
(45) Date of Patent: Sep. 17, 2019

(54) AMORPHOUS LOW-CALCIUM CONTENT SILICATE HYDRAULIC BINDERS AND METHODS FOR THEIR MANUFACTURING

(71) Applicants: CIMPOR—CIMENTOS DE PORTUGAL, SGPS, S.A., Lisbon (PT); INSTITUTO SUPERIOR TECNICO, Lisbon (PT)

(72) Inventors: Ricardo Simoes Bayao Horta, Lisbon (PT); Rogerio Anacleto Cordeiro Colaco, Lisbon (PT); Jose Nuno Aguiar Canongia Lopes, Lisbon (PT); Rodrigo Lino Dos Santos, Ramada (PT); Joao Chaves Pereira, Linda-A-Velha (PT); Paulo Jose Pires Da Rocha E Silva, Lisbon (PT); Sandra Maria Martin Lebreiro, Lisbon (PT)

(73) Assignee: CIMPOR PORTUGAL, SGPS, SA., Lisbon (PT)

( * ) Notice: Subject to any disclaimer, the term of this patent is extended or adjusted under 35 U.S.C. 154(b) by 0 days.

(21) Appl. No.: 15/544,605

(22) PCT Filed: Jan. 19, 2015

(86) PCT No.: PCT/PT2015/000006
§ 371 (c)(1),
(2) Date: Jul. 19, 2017

(87) PCT Pub. No.: WO2016/118030
PCT Pub. Date: Jul. 28, 2016

(65) Prior Publication Data
US 2017/0349485 A1 Dec. 7, 2017

(51) Int. Cl.
| *C04B 7/345* | (2006.01) |
| *C04B 7/26* | (2006.01) |
| *C04B 7/43* | (2006.01) |
| *C04B 7/47* | (2006.01) |

(52) U.S. Cl.
CPC ............... *C04B 7/345* (2013.01); *C04B 7/26* (2013.01); *C04B 7/43* (2013.01); *C04B 7/47* (2013.01); *Y02P 40/145* (2015.11)

(58) Field of Classification Search
CPC .. C04B 7/345; C04B 7/26; C04B 7/43; C04B 7/47
See application file for complete search history.

(56) References Cited

U.S. PATENT DOCUMENTS

2010/0206199 A1\* 8/2010 Beuchle ................. C01B 33/20
106/801

FOREIGN PATENT DOCUMENTS

| DE | 102007035258 | | 11/2008 | |
| JP | 60166383 A | \* | 8/1985 | ............. C04B 14/04 |
| JP | 2003012353 A | \* | 1/2003 | ............. C04B 14/08 |
| WO | 199419293 | | 9/1994 | |
| WO | WO-2016118029 A1 | \* | 7/2016 | ........... C04B 28/021 |
| ZA | 9400653 B | \* | 9/1994 | |

OTHER PUBLICATIONS

Stephen P. Thompson et al: "Fine-grained amorphous calcium silicate CaSi03 from vacuum dried sol-gel—Production, characterisation and thermal behaviour", Journal of Non-Crystalline Solids, vol. 358, No. 5, Mar. 1, 2012 (Mar. 1, 2012), pp. 885-892, XP055211776, ISSN: 0022-3093, DOI: 10.1016/j.jnoncrysol.2011.12.\*
Thompson; Fine-grained amorphous calcium silicate CaSiO3 from vacuum dried sol-gel—Production, characterisation and thermal behaviour ; Journal of Non-Crystalline Solids; vol. 358, Issue 5, Mar. 1, 2012, pp. 885-892 ; Abstract.
International Search Report, PCT/PT2015/000006, dated Sep. 30, 2015.

\* cited by examiner

*Primary Examiner* — Anthony J Green
(74) *Attorney, Agent, or Firm* — Porzio Bromberg & Newman P.C.

(57) ABSTRACT

The invention relates to a hydraulic binder consisting essentially in a hydraulically active amorphous calcium silicate phase, having in its constitution less than 20% in weight of a crystalline material. The said hydraulically active amorphous calcium silicate phase is a continuous matrix that may contain embedded fractions of crystalline material, being the overall C/S molar ratio of this hydraulic binder comprised between 0.8 and 1.25.
The crystalline fraction of this material is essentially composed by wollastonite in both of its polymorphic structures, α and β. Furthermore, the invention relates to methods of producing the hydraulic binder by liquefying the raw materials, in a specified C/S molar ratio, followed by fast cooling to room temperature. Finally, the invention relates to a building material made by setting the binder or a mixture containing this binder with water and subsequent hardening. The invention enables the production of a hydraulic binder with a significant reduction of $CO_2$ emissions, when compared to OPC clinker, by reducing the amount of limestone in the raw materials while obtaining competitive overall values of compressive strength of the hardened material.

3 Claims, 5 Drawing Sheets

Figure 2)
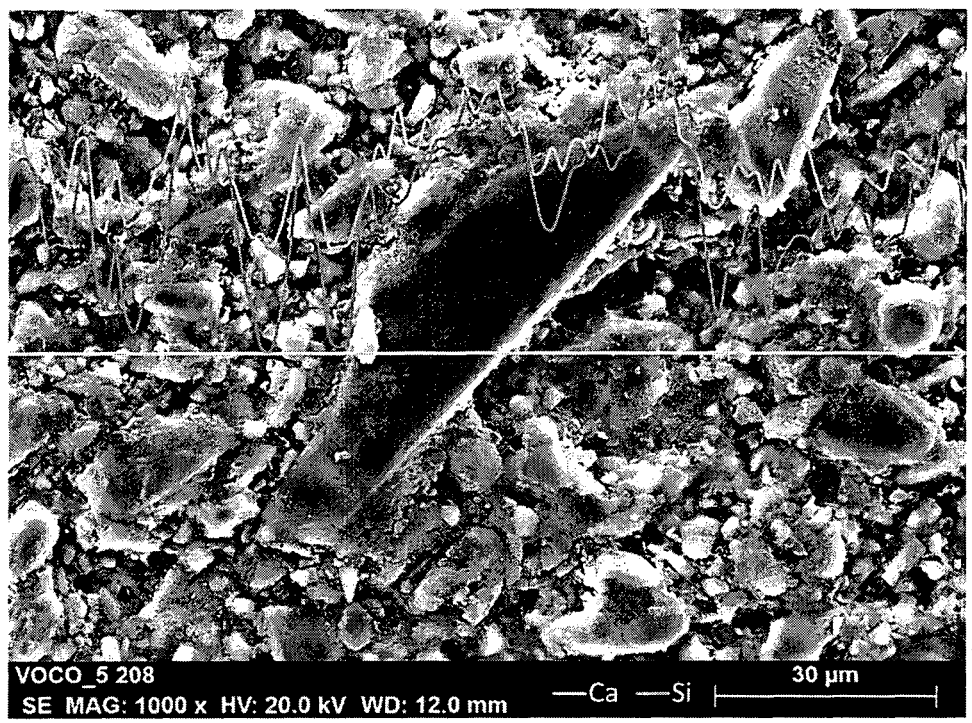
Figure 3)
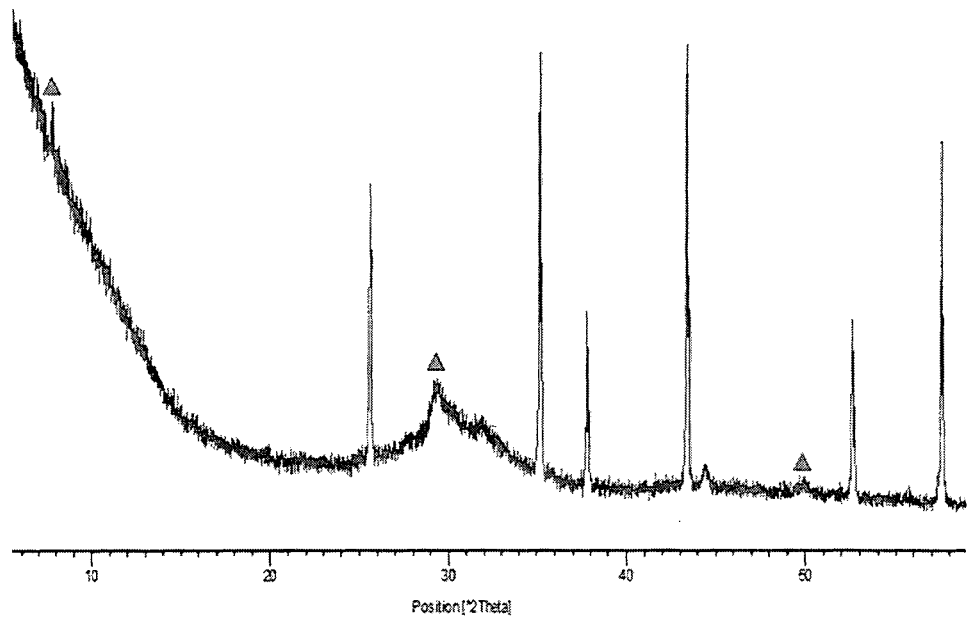

Figure 4)
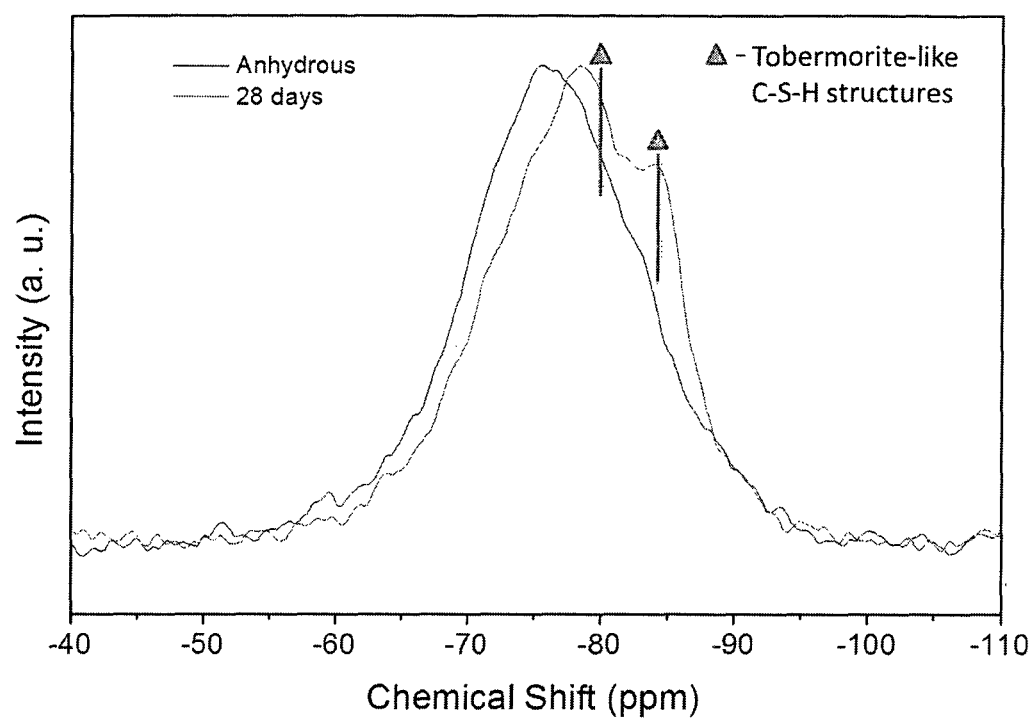

AMORPHOUS LOW-CALCIUM CONTENT SILICATE HYDRAULIC BINDERS AND METHODS FOR THEIR MANUFACTURING

BACKGROUND OF THE INVENTION

The present invention relates to a new hydraulic binder comprising a hydraulic active amorphous calcium silicate phase that may contain embedded some residual wollastonite. The hydraulic binder is produced by a combination of heating and cooling operations.

Concrete is one of the most worldwide used manufactured materials. Cement, in particular ordinary Portland Cement (OPC) is the component of concrete responsible for its strength when reacting with water. The present world production of OPC is around 4 billion metric tons per year.

Herein, the following abbreviations, which are conventional in the art, are used, unless otherwise stated:
C represents CaO (calcium oxide);
H represents $H_2O$ (water);
S represents $SiO_2$ (silica);
A represents $Al_2O_3$ (alumina);
F represents $Fe_2O_3$ (iron (III) oxide);
CSH represents an amorphous calcium silicate hydrate, which results from the hydraulic reaction;
Amorphous means a non-crystalline solid phase;
$C_3S$ represents tricalcium silicate ($3CaO.SiO_2$), known as alite;
$C_2S$ represents dicalcium silicate ($2CaO.SiO_2$), wherein belite is any of the allotropic forms of $C_2S$;
$C_3S_2$ represents $3CaO.2SiO_2$, known as rankinite;
CS represents calcium silicate ($CaO.SiO_2$), wherein wollastonite is any of the allotropic forms of CS;
CH represents calcium hydroxide $Ca(OH)_2$, known as portlandite; and
BAT means best available technology.

Further, herein the expression "hydraulic binder" means a compound or composition which sets and hardens in the presence of water by hydration, resulting in a solid material. The hydraulic binder is in particular cement, and the solid material is in particular concrete. The expression "latent hydraulic" means the property of a compound or composition to become hydraulic active when mixed with a hydraulic active phase. This means that the compound or composition is not hydraulic in itself but would become so when it is present together with a hydraulic active phase and is exposed to calcium-rich water solutions which triggers that property leading to setting and hardening of the material. Latent hydraulic compounds modify the hydration products formed and as a result modify the properties of cement pastes, mortars and concretes. Also the expressions "highly amorphous" or "essentially amorphous" refer to a material mainly composed of an amorphous phase, i.e. having residual or none crystalline fraction in its constitution.

The best available technology (BAT) for the industrial production of cement uses a well-established two-step technology. In modern plants, the first step is carried out continuously in a rotary kiln, fed with limestone, different silica content materials and fuel (usually "pet coke", coal or natural gas) producing, at around 1450° C., a clinker composed of about 75% of alite ($C_3S$) (this amount could range from 55 to 78% for conventional OPC clinker), which is afterwards cooled down in a grate or satellite cooler before being stored. The alite ($C_3S$) is the silicate most responsible for the good hydraulic behavior of the material. In the second step the clinker is ground, generally to a Blaine specific surface between 3000 and 3500 $cm^2/g$ and eventually mixed with other materials aiming at different corrections and other purposes.

The concept of the existing cement BAT is based on the production of an alitic ($C_3S$) clinker which requires around 1250 kg of limestone per ton of clinker and kiln temperatures around 1450° C., in spite of the use of some fluxes. After grinding, the alite crystals react with water, forming a silicate gel (poorly crystalline calcium silicate hydrate)—CSH—generally with a C/S molar ratio between 1.7 and 1.8 and, simultaneously, a significant amount of portlandite CH ($Ca(OH)_2$). The strength of the cement stone is determined by the structure and chemical composition of the CSH gel, which, at 28 days, represents 40 to 50% in weight. Portlandite generally represents 20 to 25% in weight and contributes to the pH value of the material, but with regard to strength it is an undesired by-product.

Due to the use of limestone as the source of calcium and the high temperature required for the clinkerization process to obtain $C_3S$, the ecological footprint of this BAT for the industrial cement production is quite high, namely as regards $CO_2$ emissions (over 800 kg per ton of clinker), derived both from the decarbonation of the limestone (approximately 60% of the emissions) and the burning of the fuel (remaining 40% of the emissions). As a result, the cement industry is today responsible for more than 5% of all worldwide anthropogenic emissions of $CO_2$.

Due to the fact that OPC is a very versatile, easy to use, durable and relatively inexpensive building material its application is an important element for the social and economic development and well-being of today's society.

Designing and developing a hydraulic binder matching the technical, economic and workability qualities of OPC, and allowing a reduction of the ecologic footprint, namely $CO_2$ emissions, represents simultaneously a great challenge both to the technical research and development and to the fulfilment of the social responsibility obligations of the world cement industry.

Over the last decade the cement industry tried to respond to this challenge using alternative raw materials and fuels that could result in decreasing the $CO_2$ emissions. Some approaches target the partial or total substitution of calcium for other elements with impact on the reduction of $CO_2$ content in the raw materials. Others try to reduce the amount of calcium required developing belitic clinkers. Still others try to develop alternative non-clinker technological routes.

Another subject that has also been object of some attention is the utilization of SCMs (supplementary cementitious materials), such as metakaolin, fly-ashes or slag. SCMs by their selves do not have interesting hydraulic properties being classified as latent hydraulic materials, meaning that they have little hydraulic activity when mixed with pure water, which is why these materials are often mixed with Portland cement (that acts as an activator) to obtain a hydraulic binder able to set and harden when mixed with water. Blends of cement with slag have already been found to have excellent durability as well as compressive strengths comparable to or higher than OPC. In fact, the hydration of slag leads to the formation of calcium silicate hydrates (CSH) with a specific pore size distribution that reduces the permeability of the resulting paste, particularly at early ages.

Representative examples of the state of art are three particular products which are described in patent literature as follows: i) a hydraulic binder being a cement based on a Belite-Calcium-Sulfoaluminate-Ferrite (BCSAF) clinker, which is a clinker with low or no content of alite, described in e.g., U.S. Pat. No. 8,177,903 B2, U.S. Pat. No. 8,317,915

B2, or US 2012/0085265 A1; ii) a hydraulic binder being based on the same raw materials as used in "classical" cement production but using a lower molar Ca/Si ratio, described in e.g., DE 10 2007 035 257 B3, DE 10 2007 035 258 B3, DE 10 2007 035 259 B3, DE 10 2005 037 771 B4, or DE 10 2005 018 423 A1; and iii) a hydraulic binder comprising a ground blast furnace slag, described in EP 2507188 A1, CA 2782232 A1, CN 102666426 A, U.S. Pat. No. 8,328,931 B2, US 2012/0234209 or WO 2011/064378 A1.

On a world scale, the investment of the cement industry in the existing BAT for OPC production is considerable, creating an important economic constraint to a drastic alteration of the existing technology.

Thus, the problem underlying the present invention was to provide hydraulic binders and a process for their production using the traditional clinker route and producing less $CO_2$ emissions than in conventional cement production.

SUMMARY OF THE INVENTION

It was found that one of the possible solutions for this technical problem comprises the formation of a hydraulically active amorphous calcium silicate with a C/S molar ratio between 1.25 and 0.8, that is, chemical compositions similar to wollastonite (CS). This amorphous calcium silicate materials can be produced by a process compared to the traditional clinker route, involving specific heating and cooling steps.

Thus, the present invention relates to a hydraulic binder comprising an amorphous calcium silicate phase of chemical composition within the wollastonite region of the CaO—$SiO_2$ equilibrium diagram. The hydraulic binder is preferably fully amorphous; however an amount of wollastonite not exceeding 20% in weight may be present. The scope of the present invention also comprises the mixtures containing at least 10% of this hydraulic binder.

The invention refers to a process for producing a hydraulic binder comprising one hydraulic active amorphous calcium silicate phase with C/S molar ratio in the range of from 0.8 to 1.25, comprising the steps (as shown in FIG. 1a):

A. Heating raw material containing at least calcium oxide and silica in an overall C/S molar ratio in the range of from 0.8 and 1.25 to a temperature $T_1$, where $T_1$ is within the range in which the material is fully liquefied, and B. Optionally maintaining at that temperature $T_1$, during a period $t_1$ until homogenization of the heated material, and C. Fast cooling to ambient temperature.

In addition, the invention refers to a hydraulic binder obtainable by the processes described above, and a building material obtainable by mixing the hydraulic binder with water.

Preferred embodiments of the invention are described in the description hereinafter (including examples), the claims and the figures.

BRIEF DESCRIPTION OF THE DRAWINGS

FIG. 2) shows a SEM image of a paste.
FIG. 3) shows the XRD diffractogram of a paste.
FIG. 4) is a $^{29}Si$ MAS-NMR spectra.

DETAILED DESCRIPTION

Figure 1A:
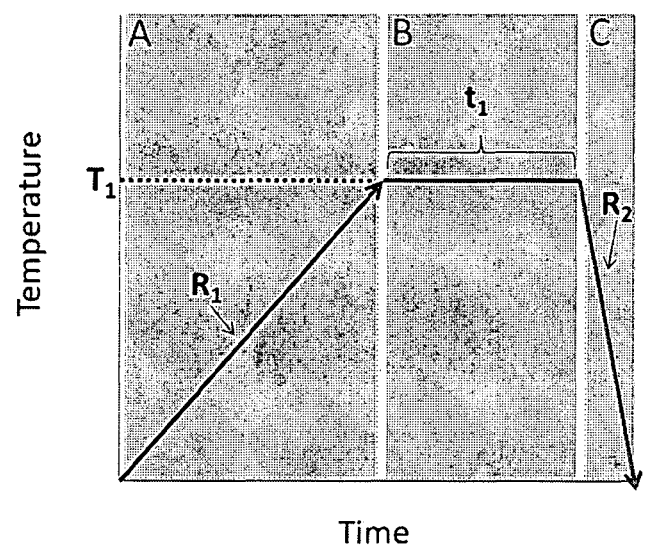
FIG. 1a) shows a temperature versus time diagram.

FIG. 1a) shows a temperature versus time diagram indicating the temperature course for the process according to the invention.

Figure 1B:
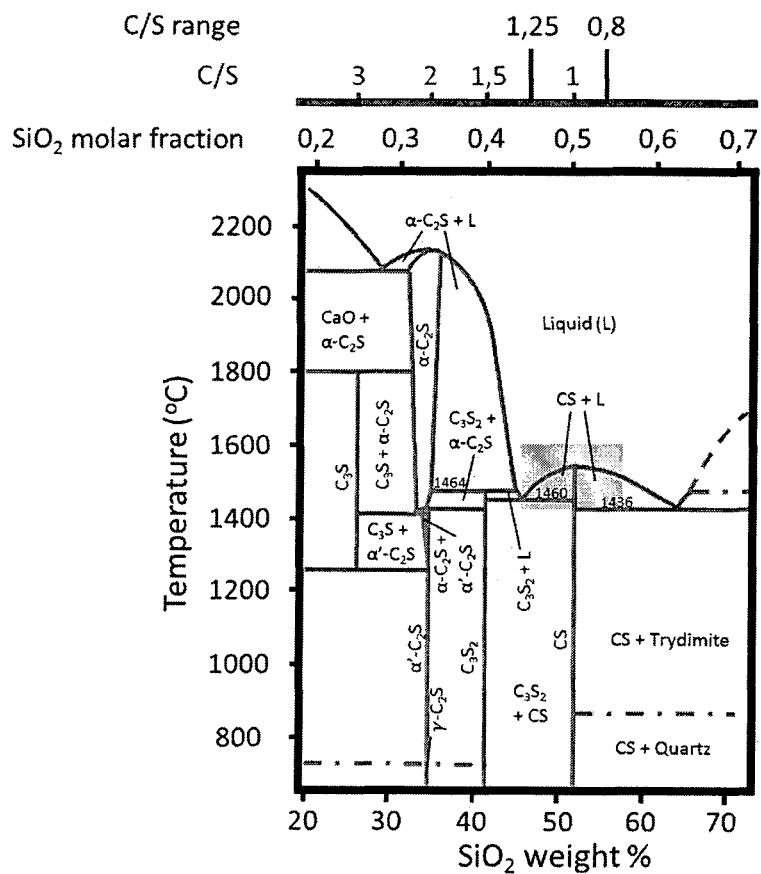
FIG. 1b) shows a CaO—SiO2 phase diagram.

FIG. 1b) shows the CaO—SiO2 phase diagram indicating the amount of silica with the balance being calcium oxide and the range of the C/S molar ratio in the silicate relevant to the invention.

Figure 1C:
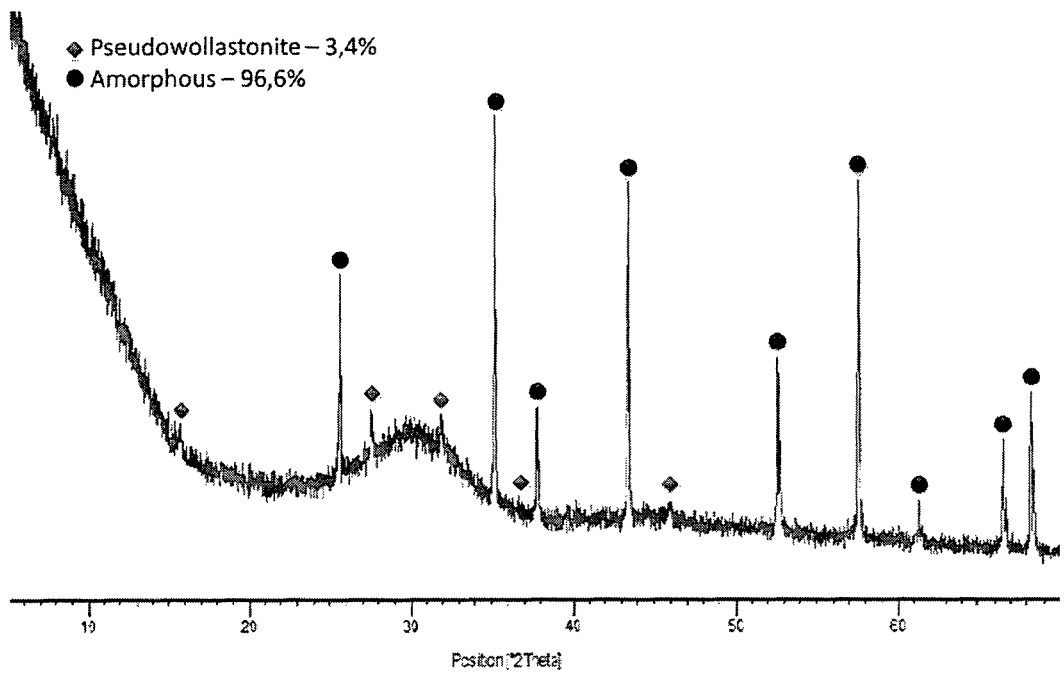
FIG. 1c) shows a XRD diffractogram and corresponding Rietveld refinement of an anhydrous hydraulic binder with an overall C/S molar ratio of 1.1.

FIG. 1c) shows a XRD diffractogram and corresponding Rietveld refinement of an anhydrous hydraulic binder, with an overall C/S molar ratio of 1.1, obtained by the process described in FIG. 1a). The blue diamonds indicate the presence of pseudowollastonite while the black circles are referred to corundum phase used as internal standard for the determination of the weight percentage of amorphous phase.

Figure 1D:
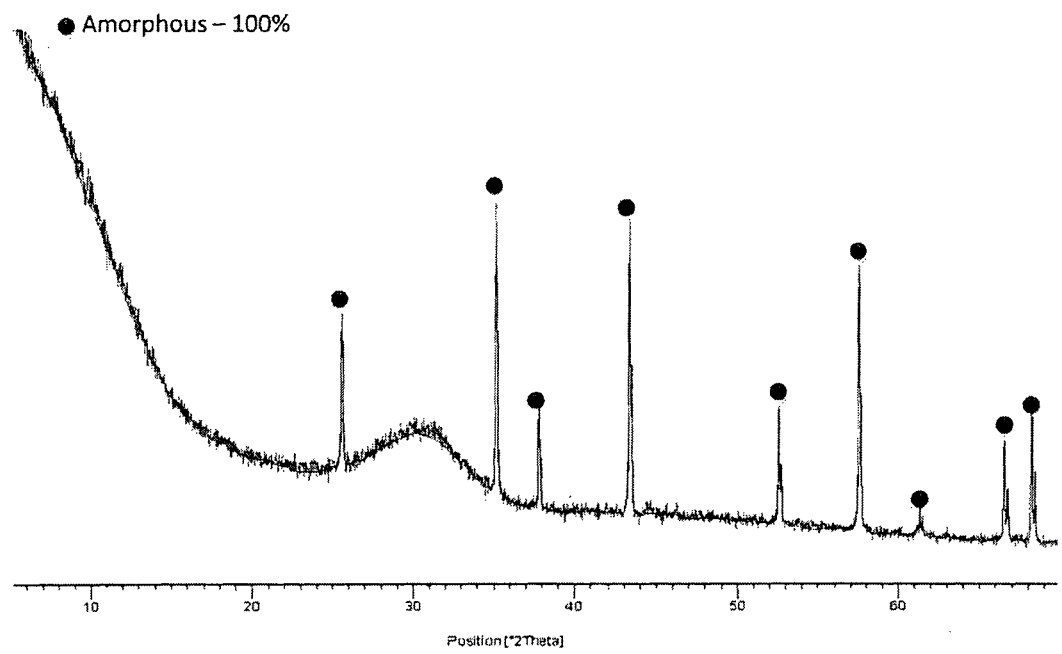
FIG. 1d) shows a XRD diffractogram and corresponding Rietveld refinement of an anhydrous hydraulic binder with an overall C/S molar ratio of 1.25.

FIG. 1d) shows a XRD diffractogram and corresponding Rietveld refinement of an anhydrous hydraulic binder, with an overall C/S molar ratio of 1.25, obtained by the process described in FIG. 1a). The black circles are referred to corundum phase used as internal standard for the determination of the weight percentage of amorphous phase. In this case a fully amorphous hydraulic binder was produced.

FIG. 2) shows a SEM image of a paste produced by mixing the described amorphous calcium silicate phase, with a C/S molar ratio of 1.1, with water after 28 days. It is also shown the distribution of Ca and Si atoms, as determined by EDS, along the yellow line represented in the figure.

FIG. 3) shows the XRD diffractogram of a paste produced by mixing the described amorphous calcium silicate phase, with a C/S molar ratio of 1.25, with water after 28 days. Green triangles indicate the corresponding peaks of tobermorite-like structures in the C—S—H formed. It is also possible to conclude that no formation of portlandite has occurred, since its main peak at around 18° (2θ) is not present.

FIG. 4) is a $^{29}Si$ MAS-NMR spectra showing the structural evolution with respect to the silicon coordination as the hydration develops for 28 days in a paste produced by mixing the described amorphous calcium silicate phase, with a C/S molar ratio of 1.25, with water. It is possible to observe polymerization of lower $Q^n$ coordinated units as the spectra dislocates to higher chemical shifts with hydration time, as well as it can be easily identified the development of tobermorite-like C—S—H structures by the presence of its typical peaks at chemical shifts around −80 and −85 ppm.

In the CaO—$SiO_2$ phase diagram, as to be seen from FIG. 1b), when starting from alite ($C_2S$), a decrease in calcium leads first to the formation of belite ($C_2S$), in one of its five allotropic forms α, α'$_L$, α'$_L$, β and γ, then to rankinite ($C_2S_2$) and finally to wollastonite (CS), the latter with two allotropic forms α and β. Considering the previous path of analysis in the CaO—$SiO_2$ phase diagram, from the point of view of the $Q^n$ structural units, the connectivity increases as the amount of calcium decreases leading to a structural evolution from $Q^0$ units with some free oxygen, in the case of alite, to belite with only $Q^0$ units, then to rankinite constituted by dimers ($Q^1$ structural units) and finally to wollastonite whose crystalline structure consists of infinite linear silicate chains or $Q^2$ units.

It is well established in the art that belite shows a weak and slow hydraulic activity and both rankinite and wollastonite show no hydraulic activity at all, however the present invention provides amorphous silicates around the wollastonite chemical composition that are hydraulically active.

The process of the invention utilizes a selected region of the $CaO$—$SiO_2$ phase diagram, combined with specific heating and cooling operations, to produce amorphous "low calcium" silicates.

The hydraulic binders comprise one amorphous hydraulic active silicate phase or combinations with other external hydraulic active or latent hydraulic crystalline and/or amorphous silicate phases.

In preferred embodiments of the hydraulic binder of the invention, a part of the calcium or silicon of the hydraulic active amorphous phase is substituted by a metal selected from Al, Fe, Mg, B, S, P, K, Na, or any combination thereof. The percentage of substitution is preferably from 1% to 20%, in particular from 5% to 15%.

The hydraulic binder of the invention can be produced by processes using the common clinkerization process but necessarily obtaining full liquefaction of the materials. The process comprises one heating step and one single cooling step. First, the raw materials are heated to a temperature $T_1$ which is within the temperature range of the liquid (L) silicate phase. From the phase diagram, e.g. FIG. 1b), the skilled person can determine suitable values for $T_1$. In FIG. 1b) the rectangle indicates the range of process temperatures ($T_1$) being suitable for the production of the preferred fully amorphous calcium silicates.

Suitable values for $T_1$ can be taken from e.g. FIG. 1b). Depending on the composition used, preferably, the temperature $T_1$ is within the range of from 1300° C. to 1600° C., more preferably from 1450° C. to 1550° C., most preferably from 1500° C. to 1550° C. The heating is carried out at a suitable rate $R_1$, which is similar to, or the same as, the heating rate used in the BAT. The rate $R_1$ depends on the quantity of material used and the heat source. A suitable and preferred value for $R_1$ is 25° C./min.

The raw materials used are raw materials common in the art, e.g. limestone, clays and other argillaceous materials, marls, sandstone, fly ash, natural and artificial pozzolanic materials, mineral industrial residues, slags or diatomites. The raw materials contain at least limestone and silica (amorphous or in quartz form).

In the production of the hydraulically active amorphous silicate object of the invention, the overall C/S molar ratio is in the range of 0.8 to 1.25, preferably from 1.0 to 1.25 and the cooling from $T_1$ is carried out in one single step.

Depending on the amount of material used and the heating conditions, optionally the heated materials are maintained at the temperature $T_1 \pm \Delta T$ for a time $t_1$ until homogenization of the heated material is obtained. Preferably, $\Delta T=50°$ C., and the time $t_1$ is in the range of from 5 min to 100 min, in particular of from 10 min to 60 min.

A most preferred process is described in FIG. 1a).

FIG. 1.a) shows a production cycle which comprises the following steps:

A. Heating raw material containing at least calcium oxide and silica in an overall C/S molar ratio in the range of from 0.8 to 1.25, preferably from 1.0 to 1.25, to a temperature $T_1$, wherein $T_1$ is within the liquid (L) range in the $CaO$—$SiO_2$ phase diagram; and B. Optionally maintaining at that temperature $T_1$ until homogenization of the heated material; and C. Cooling rapidly, in a single step, to ambient temperature.

Suitable values for the temperature $T_1$ can be determined by the skilled person from the phase diagram, e.g. from FIG. 1b). Also, suitable times for maintaining the material at $T_1$ and suitable cooling conditions can be determined by the skilled person aiming at the achievement of a fully amorphous silicate.

Preferably, the processes of the invention further comprise grinding the material obtained after cooling to a Blaine specific surface above 3000 $cm^2/g$, in particular above 3500 $cm^2/g$. Such a grinding step is known in the art and can be carried out by conventional procedures.

The invention further comprises a hydraulic binder prepared, obtained or obtainable by a process as described herein.

For preparing a building material, the hydraulic binder is mixed with water. Preferably, the amount of water added does not exceed 50% of weight based on 100% of weight of hydraulic binder, preferably, of from 10% to 40% by weight. Upon water addition, the hydraulic binder hydrates and hardens. In a preferred embodiment, the hydrated material comprises substantially no portlandite (calcium hydroxide), in particular less than 1% by weight.

The following examples illustrate the invention without restricting the scope of protection.

Example 1

Production of a Hydraulic Binder Consisting Essentially of an Amorphous Calcium Silicate with an Overall C/S Molar Ratio Equal to 1.1

A hydraulic binder with C/S molar ratio of 1.1 was obtained in a three-steps procedure comprising:

A. Heating the raw mixture described in table 1 to a temperature $T_1$ of 1500° C., at a heating rate of 25° C./min, in the liquid region of $CaO$—$SiO_2$ diagram for this composition;

B. Maintaining $T_1$ for a $t_1$ of 60 minutes;

C. Cooling to room temperature in air, at a cooling rate around 300° C./min.

The obtained hydraulic binder, consisting in over 95% of an amorphous calcium silicate and some residual pseudo-wollastonite (as determined by Rietveld analysis and shown in FIG. 1c), was then ground to fineness below 30 µm and mixed with water to a water/binder ratio of 0.375 in weight.

The paste was poured in into proper molds to produce test pieces of dimensions 20×20×40 mm.

The compressive strength of this hydraulic binder after 28 days is more than 30 MPa and after 90 days goes over 45 MPa. FIG. 2 shows a SEM image of a 28 days hydrated paste with a linear EDS mapping of Ca and Si elements.

TABLE 1

Raw material composition and mixture proportions for the
production of said hydraulic binder, with an overall C/S molar
ratio of 1.1. The theoretical composition of the final product is
shown in the last column.

| | Weight % | | | | |
|---|---|---|---|---|---|
| | 2.28% | 32.93% | 2.12% | 62.67% | |
| | Raw-Mat. | | | | Theoretical |
| | Fly-ash | Sand | Slag | Limestone | Clinker |
| L.O.I. | 4.54 | 0.37 | −3.00 | 43.34 | 0.00 |
| $SiO_2$ | 57.07 | 97.30 | 13.90 | 1.62 | 46.85 |
| $Al_2O_3$ | 23.91 | 1.29 | 8.26 | 0.30 | 1.70 |
| $Fe_2O_3$ | 8.68 | 0.16 | 43.54 | 0.23 | 1.75 |
| CaO | 3.96 | 0.00 | 21.18 | 96.77 | 48.03 |
| MgO | 1.56 | 0.02 | 6.06 | 0.39 | 0.43 |
| $SO_3$ | 0.12 | 0.00 | 0.40 | 0.02 | 0.02 |
| $K_2O$ | 1.84 | 0.52 | 0.00 | 0.02 | 0.30 |
| $Na_2O$ | 0.62 | 0.11 | 0.00 | 0.12 | 0.13 |
| $TiO_2$ | 0.00 | 0.00 | 0.46 | 0.00 | 0.01 |
| $Cr_2O_3$ | 0.00 | 0.00 | 1.98 | 0.00 | 0.06 |
| $P_2O_5$ | 0.00 | 0.00 | 0.46 | 0.00 | 0.01 |
| MnO | 0.00 | 0.00 | 3.76 | 0.00 | 0.11 |

TABLE 2

Raw material composition and mixture proportions for the
production of a fully amorphous calcium silicate, with a C/S molar
ratio of 1.25. The theoretical composition of the final product is
shown in the last column.

| | Weight % | | | | |
|---|---|---|---|---|---|
| | 2.24% | 30.11% | 2.08% | 65.56% | |
| | Raw-Mat. | | | | Theoretical |
| | Fly-ash | Sand | Slag | Limestone | Clinker |
| L.O.I. | 4.54 | 0.37 | −3.00 | 43.34 | 0.00 |
| $SiO_2$ | 57.07 | 97.30 | 13.90 | 1.62 | 43.84 |
| $Al_2O_3$ | 23.91 | 1.29 | 8.26 | 0.30 | 1.66 |
| $Fe_2O_3$ | 8.68 | 0.16 | 43.54 | 0.23 | 1.75 |
| CaO | 3.96 | 0.00 | 21.18 | 96.77 | 51.07 |
| MgO | 1.56 | 0.02 | 6.06 | 0.39 | 0.44 |
| $SO_3$ | 0.12 | 0.00 | 0.40 | 0.02 | 0.02 |
| $K_2O$ | 1.84 | 0.52 | 0.00 | 0.02 | 0.28 |
| $Na_2O$ | 0.62 | 0.11 | 0.00 | 0.12 | 0.13 |
| $TiO_2$ | 0.00 | 0.00 | 0.46 | 0.00 | 0.01 |
| $Cr_2O_3$ | 0.00 | 0.00 | 1.98 | 0.00 | 0.06 |
| $P_2O_5$ | 0.00 | 0.00 | 0.46 | 0.00 | 0.01 |
| MnO | 0.00 | 0.00 | 3.76 | 0.00 | 0.11 |

Example 2

Production of a Hydraulic Binder Consisting of a
Fully Amorphous Calcium Silicate with an Overall
C/S Molar Ratio Equal to 1.25

The hydraulic binder with an overall C/S molar ratio of 1.25 was obtained in a three-step procedure comprising:

A. Heating the raw mixture described in table 2 to a temperature $T_1$ of 1500° C., at a heating rate of 25° C./min, in the liquid region of CaO—$SiO_2$ diagram for this composition;

B. Maintaining $T_1$ for a $t_1$ of approximately 60 minutes;

C. Cooling to room temperature in air, at a cooling rate of about 300° C./min.

The obtained hydraulic binder, consisting in a fully amorphous calcium silicate (as determined by Rietveld analysis and shown in FIG. 1*d*) was then ground to fineness below 30 µm and mixed with water to a water/binder ratio of 0.375 in weight.

The paste was poured in into proper molds to produce test pieces of dimensions 20×20×40 mm.

The compressive strength of this hydraulic binder after 28 days is higher than 25 MPa and after 90 days goes over 35 MPa.

FIG. 3 shows a diffractogram of a 28 days paste produced with this fully amorphous hydraulic binder, where it is possible to observe the development of peaks related to the presence of tobermorite-like structures (identified by the green triangles). The presence of these structures was also confirmed by $^{29}$Si MAS NMR, as it is shown in FIG. 4 by the spectra obtained for an anhydrous and a 28 days hydrated sample. The chemical shifts of the Tobermorite-like structures are identified by the green triangles in the spectra of FIG. 4.

Example 3

Production of a Hydraulic Binder by Mixing Alite
Rich Clinker with an Amorphous Calcium Silicate,
with an Overall C/S Molar Ratio Equal to 1.1, as
Described in Example 1

A highly amorphous calcium silicate with an overall C/S molar ratio of 1.1 was obtained in a three-step procedure, as described in Example 1.

The obtained hydraulic binder with an overall C/S molar ratio of 1.1 was then ground to fineness below 30 µm and mixed with 10% in weight of alitic clinker.

This mixture was used to produce a paste with a water/binder ratio of 0.375 in weight.

The paste was poured in into proper molds to produce test pieces of dimensions 20×20×40 mm.

After 28 days, the compressive strength of the described blend was higher than 35 MPa due to the addition of 10% of alitic clinker.

Example 4

Production of a Hydraulic Binder by Mixing an
Amorphous Calcium Silicate, with an Overall C/S
Molar Ratio Equal to 1.1, as Described in Example
1, with a Sulphated Activator A highly amorphous calcium silicate with a C/S molar ratio of 1.1 was obtained in a three-step procedure, as described in Example 1.

The obtained amorphous calcium silicate with a C/S molar ratio of 1.1 was then ground to fineness below 30 µm and mixed with 2% in weight of $SO_3$ in the forms of $Na_2SO_4$ or $CaSO_4$.

These mixtures were used to produce pastes with a water/binder ratio of 0.375 in weight.

The pastes were poured in into proper moulds to produce test pieces of dimensions 20×20×40 mm.

After 28 days, the compressive strength of the described blends was higher than 35 MPa for the addition of $CaSO_4$ and higher than 40 MPa for the addition of $Na_2SO_4$, while after 90 days the compressive strengths were about 65 MPa for the mixture with $CaSO_4$ and higher than 68 MPa for the mixture with $Na_2SO_4$.

The Examples illustrate the production of a low-calcium silicate hydraulic binder comprising the presence of a new hydraulically active amorphous calcium silicate and a full range of possible combinations with other hydraulically active phases and/or latent hydraulic phases and/or other activators such as alkaline silicates, sulphates, carbonates, phosphates, nitrates, hydroxides, fluorides or chlorides, in the anhydrous or in the hydrated form.

The concept of obtaining a highly amorphous hydraulic binder with C/S molar ratio below 1.25, preferably between 1.25 and 1.0 object of this invention contributes positively for a further significant reduction of $CO_2$ emissions while obtaining competitive overall values of compressive strength of the hardened material.

Lisbon, Jan. 15, 2015.

The invention claimed is:

1. A method for the production of t hydraulic binder comprising an amorphous calcium silicate matrix containing less than 20% in weight of a wollastonite crystalline phase in any of its α or β polymorphs, with an overall C/S molar ratio in the range from 0.8 to 1.25 comprising the steps of:
    A. heating raw material, containing at least calcium and silicon in an overall C/S molar ratio in the range from 0.8 to 1.25, to a temperature Ti wherein Ti is within a liquid (L) region and the raw material is totally liquid for the range of chemical compositions comprised between the C/S molar ratios of 0.8 and 1.25 in a $CaO\text{---}SiO_2$ binary phase diagram; and
    B. optionally maintaining at that temperature Ti until homogenization of the heated material; and
    C. cooling to room temperature.

2. The method of claim 1 further comprising a grinding stage after cooling to a Blaine specific surface above 3000 cm2/g.

3. The method of claim 1 further comprising a grinding stage after cooling to a Blaine specific surface above 3500 cm2/g.

* * * * *